(12) United States Patent
Gueguen et al.

(10) Patent No.: US 7,722,793 B2
(45) Date of Patent: May 25, 2010

(54) METHOD OF RECUPERATING TURBINE ELEMENTS

(75) Inventors: Mathieu Gueguen, Paris (FR); Marc Jacky Vassault, Evry (FR)

(73) Assignee: SNECMA, Paris (FR)

( * ) Notice: Subject to any disclaimer, the term of this patent is extended or adjusted under 35 U.S.C. 154(b) by 5 days.

(21) Appl. No.: 12/211,930

(22) Filed: Sep. 17, 2008

(65) Prior Publication Data
US 2009/0079110 A1  Mar. 26, 2009

(30) Foreign Application Priority Data
Sep. 26, 2007  (FR)  .................................. 07 57869

(51) Int. Cl.
  B29C 73/00  (2006.01)
  B23K 26/00  (2006.01)
  B23P 6/00  (2006.01)
(52) U.S. Cl. ...................... 264/447; 264/482; 264/36.1; 264/36.18; 427/554; 427/556; 427/140; 427/142
(58) Field of Classification Search ................. 264/36.1, 264/36.18, 446, 447, 482; 427/142, 554, 427/555, 556, 559, 140; 29/889.1; 148/525, 148/DIG. 90
See application file for complete search history.

(56) References Cited

U.S. PATENT DOCUMENTS

| 4,960,611 A | 10/1990 | Fujisawa et al. |
| 5,576,069 A | 11/1996 | Chen et al. |
| 2003/0167616 A1 | 9/2003 | Harding et al. |
| 2005/0077656 A1 * | 4/2005 | Watanabe et al. ........... 264/482 |

FOREIGN PATENT DOCUMENTS

| DE | 33 25 251 A1 | | 1/1985 |
| EP | 0 504 095 A2 | | 9/1992 |
| EP | 0 956 378 B1 | | 4/2003 |
| EP | 1 496 474 A1 | | 1/2005 |
| EP | 1 507 236 A1 | | 2/2005 |
| JP | 06-272012 | * | 9/1994 |
| RU | 1785291 | * | 5/1996 |

* cited by examiner

*Primary Examiner*—Joseph S Del Sole
*Assistant Examiner*—Robert Dye
(74) *Attorney, Agent, or Firm*—Oblon, Spivak, McClelland, Maier & Neustadt, L.L.P.

(57) ABSTRACT

The invention concerns a method of recuperating a turbine element constituted of a substrate, forming the body of the element, and a protective coating adhering to the substrate. The method comprises the control of the turbine element in order to pinpoint the zones having a bonding defect between the protective coating and the substrate, and the elimination of the bonding defects between the protective coating and the substrate. The bonding defects are eliminated by means of a laser beam directed onto each zone having a bonding defect in order to induce a localized melting of the protective coating and the underlying substrate and enable a sound bond, at the level of said zone, between the protective coating and the substrate after stopping the laser beam.

13 Claims, 2 Drawing Sheets

METHOD OF RECUPERATING TURBINE ELEMENTS

TECHNICAL FIELD

The invention concerns a method of recuperating turbine elements.

"Recuperating" is taken to mean bringing into compliance a new part that has, at the end of manufacture, one or several defects that may compromise its normal use.

STATE OF THE PRIOR ART

Elements used in the constitution of a turbine must have an extremely carefully prepared finishing condition and this applies to the smallest details.

Turbine elements, in particular the elements of parts or elements close to moving parts, are provided with a protective coating, the nature of which depends on the function of these elements and their grade. For instance, the blades of a turbine are generally provided with a coating serving as thermal barrier and barrier to the diffusion of the metals constituting the blade. Also for instance, in the case of rotors formed of sections welded together, the labyrinth knife edge seals of the rotors are provided with an abrasive coating, wherein said knife edge seals are arranged opposite an abradable material integral with the fixed blades.

The protective coating is generally obtained by a plasma deposition or a laser deposition. A blade of which the principal part (or substrate) is in a metal based on nickel, cobalt, iron or titanium may have a coating for example in aluminium oxide, zirconium oxide, yttrium oxide, titanium carbide, tungsten carbide, etc. The thickness of this coating is for example between 0.05 mm and 0.5 mm.

Following the coating operation, a lack of bonding or a disbanding of the coating on the substrate of the element is sometimes observed. The defective parts may be recuperated by means of a surface treatment, namely a chemical dissolution (by means of an acid), enabling the defective coating to be eliminated. Once this operation has been carried out, a new deposition is performed. This new deposition must in turn be checked. In addition to lengthening the production cycles, the recuperating method of the prior art has drawbacks in terms of health, safety and the environment.

Moreover, the use of a laser beam to locally treat metal parts has been the subject of publications.

U.S. Pat. No. 4,960,611 discloses a method that makes it possible to put right small defects in a coating of mechanical parts, said defects being notably due to particles of dust or droplets of oil. This method has in particular been designed for vehicle motor frames, said frames being coated with several protective layers: a bonding layer, an intermediate layer and a finishing layer. To put right a defect affecting the finishing layer (particle of dust, droplet of oil), it is proposed to irradiate the defective zone of the finishing layer by a laser beam in order to sublimate the particle of dust or the droplet of oil and the adjacent zone of the finishing layer to form a miniscule cavity in the finishing layer. The cavity is then filled with a repair composition, which is hardened for example by means of a laser beam.

Document EP-A-0 504 095 discloses a method for repairing elements of a gas turbine and particularly a method of repairing blades damaged in service. In service, the blades undergo phenomena of oxidation, fissuring and metal erosion, these phenomena being due to abrasives and corrosives contained in the gas flow striking the blades. The high pressure of the gas flow circulating at high temperature then induces a deformation of the blades. This document proposes a method of repairing the blades by directing a laser beam onto a zone of the surface of the blade to be repaired. The laser beam locally melts a thin superficial layer of the blade that is then left to solidify. The solidification induces traction forces in the material underlying the treated layer, giving a concave configuration to this part of the blade. By applying the laser beam along a determined path, it is possible to reconfigure the blade.

Document DE-A-33 25 251 describes a method of recuperating a turbine element comprising a substrate coated with a ceramic layer adhering to the substrate by an adhesive layer. The method comprises the control of the part in order to pinpoint the zones having a bonding defect of the ceramic layer. The defects are pinpointed by scanning the turbine element by means of an energy beam, preferably a beam of electrons. The energy beam induces a flaking off of the ceramic layer in each defect zone. The elimination of the defects is achieved by precision grinding of the flaked off zones and addition of ceramic material.

U.S. Pat. No. 5,576,069 discloses a method of re-melting by laser a layer of zirconium oxide sputtered by plasma onto a metal element coated with a bonding layer. In order to treat the defects in the layer of zirconium oxide, this layer is superficially re-melted. A suspension of ceramic is then applied. Then the layer of ceramic is again superficially re-melted. In this method, there is no re-melting of the substrate, or the bonding layer.

DESCRIPTION OF THE INVENTION

The present invention has been designed to overcome the drawbacks of the currently used method of recuperating turbine elements.

The invention concerns a method of recuperating a turbine element constituted of a substrate, forming the body of the element, and a protective coating adhering to the substrate, wherein the method comprises:

the control of the turbine element in order to pinpoint the zones having a bonding defect between the protective coating and the substrate, the elimination of the bonding defects between the protective coating and the substrate, characterised in that the bonding defects are eliminated by means of a laser beam directed onto each zone having a bonding defect and inducing a localised melting of the protective coating and the underlying substrate to enable a sound bond after cooling of each zone, at the level of said zone, between the protective coating and the substrate after stopping the laser beam.

According to a specific embodiment, the zones having a defect, pinpointed during the control of the turbine element, are geometrically analysed in three dimensions and recorded in order to provide to the laser beam a determined path and to confer on it the characteristics enabling it to eliminate each bonding defect.

In particular, the path of the laser beam on the turbine element may be determined so as to be as rapid as possible.

According to another embodiment, the localised melting induced by the laser beam is carried out under inert or reducing atmosphere.

Advantageously, the laser beam is directed onto the zones having a bonding defect by means of an optical fibre.

The laser beam may be emitted by a YAG laser.

The method may comprise, after the elimination of the bonding defects, a new control of the turbine element in order to check if bonding defects remain between the protective coating and the substrate.

The method applies for example to the recuperation of blades or knife edge seals of turbines.

BRIEF DESCRIPTION OF DRAWINGS

The invention will be better understood and other advantages and particularities will become clear on reading the description that follows, given solely by way of indication and in no way limiting and by referring to the appended figures, among which.

DETAILED DESCRIPTION OF A SPECIFIC EMBODIMENT

Figure 1:
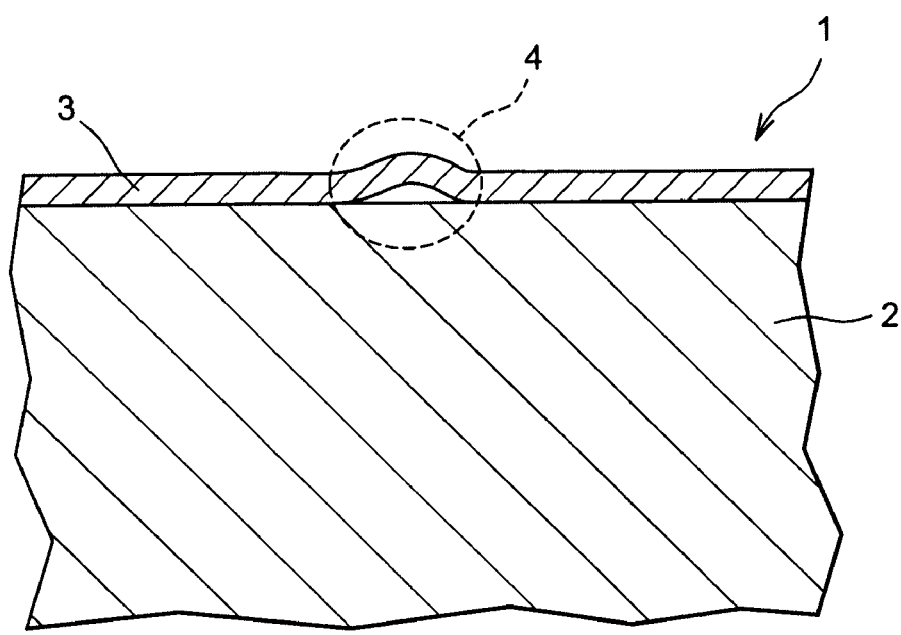
FIG. 1 is a partial view, in transversal cross-section, of a turbine element having a bonding defect zone between the body of the element and its protective coating.

FIG. 1 is a partial view, in transversal cross-section, of a turbine element, for example a blade 1. The blade 1 is constituted of a substrate 2, forming the body of the element, and by a protective coating 3.

The substrate 2 is a metal material, for example based on nickel, cobalt, iron or titanium. The protective coating 3 is for example constituted of a layer of aluminium oxide, zirconium oxide, yttrium oxide, or a metal carbide (for example of titanium or tungsten) obtained by plasma deposition or by laser deposition. The thickness of the coating is for example between 0.05 mm and 0.5 mm. The protective coating 3 must adhere to the substrate 2. However, one or several defects (lack of bonding of the coating, disbanding of the coating) may occur as is shown by reference 4.

To overcome such bonding defects, it is proposed, according to the present invention, to re-melt the protective coating in the zone of the defect to assure a physical continuity between the coating and the substrate.

Figure 2:
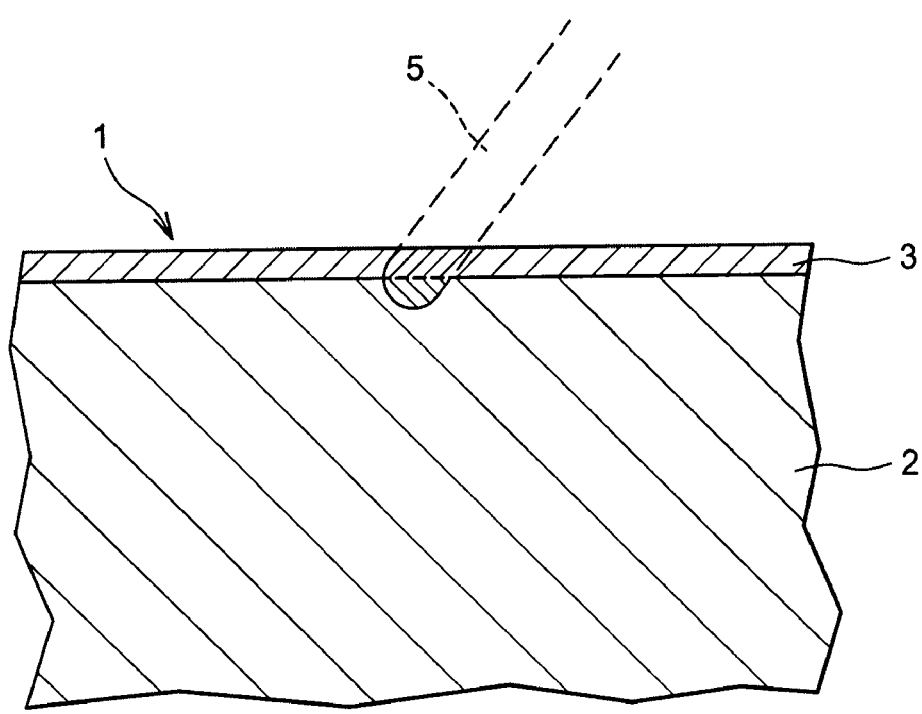
FIG. 2 represents the turbine element shown in FIG. 1 undergoing the recuperating method according the present invention.

The localised melting of the layer of coating 3 and the underlying substrate 2 is obtained by means of a laser beam 5 as shown by FIG. 2. The laser beam is for example emitted by a YAG laser and transmitted by an optical fibre up to the zone 6 comprising a part of the protective coating 3 and a part of the substrate 2. The characteristics of this YAG laser may be as follows:
  diameter of the focal spot of the laser beam on the turbine element: between 0.2 mm and 0.8 mm,
  pulse frequency: from 3 to 10 Hz,
  average power of the laser beam: between 50 and 100 W,
  pulse duration: from 5 ms to 15 ms.

It is aimed to have a constant energy density supplied to each zone to be recuperated whatever the surface area of the zone.

The method according to the invention firstly comprises a step of controlling the turbine element to pinpoint the zones having a bonding defect such as the zone 4 shown in FIG. 1. Before this operation, a cleaning of the surface of the element may be necessary in order to assure the metallurgical and mechanical quality of the substrate/protective coating bond. The zone concerned is advantageously exempt of any pollution (grease, oil, bleeding product, etc.).

The profile of each defective zone is analysed geometrically in three dimensions (positioning, geometry, dimension, etc.) to assure an optimal trajectory of the laser beam.

Once the characterisation of the turbine element has been completed, the bringing into compliance of the element is carried out. The method is implemented without input of metal. The rate at which it is carried out is managed manually or automatically. The dimension of the focal spot of the laser beam is adapted as a function of the geometry of the working zone. The average energy supplied by the laser beam is low (less than 100 W) in order to limit deformations and, in the case of a blade, to avoid the collapse of the tops of the blades.

Figure 3:
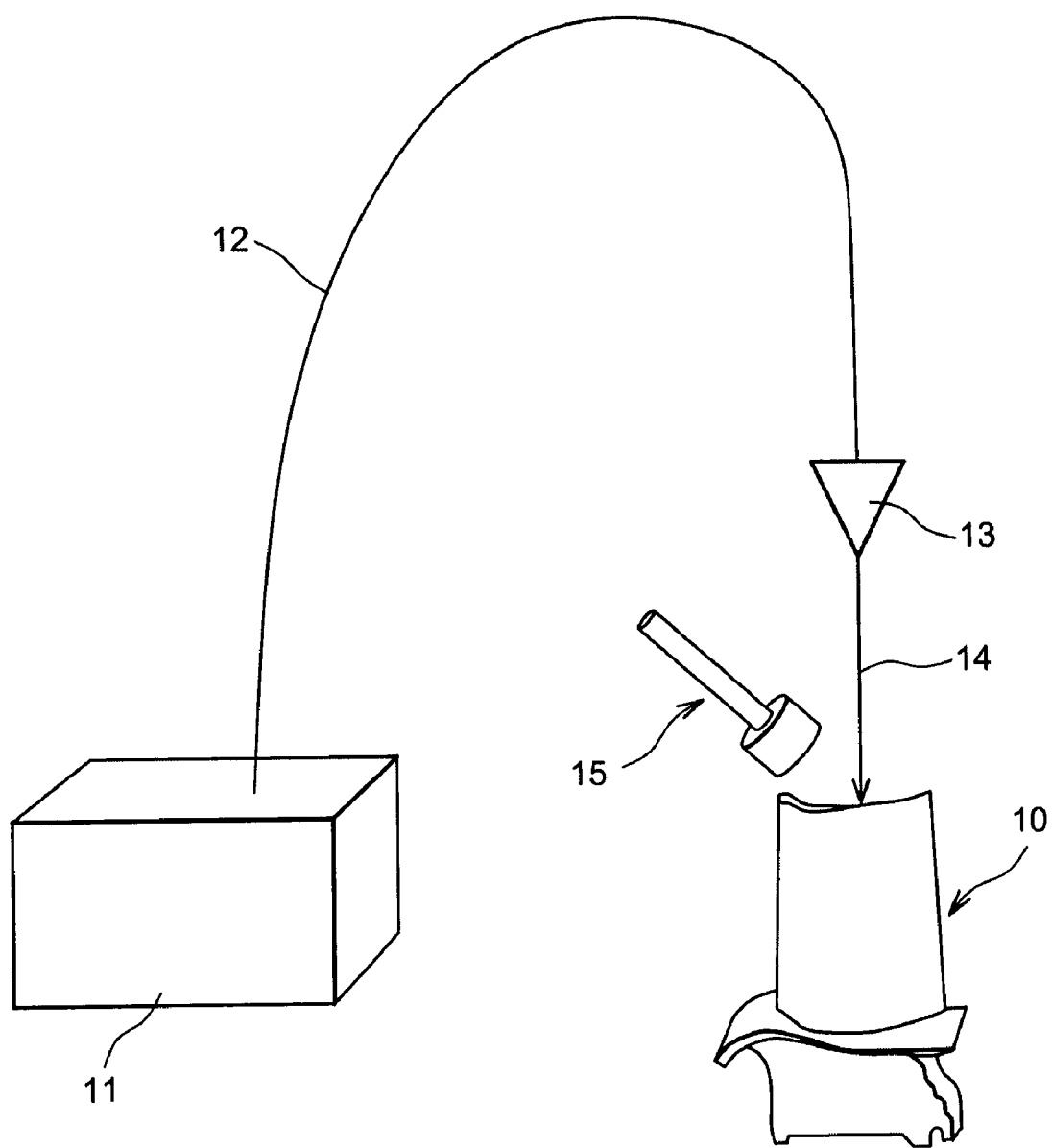
FIG. 3 illustrates the operation of eliminating bonding defects between the substrate and the protective coating of a turbine element.

FIG. 3 illustrates the operation of eliminating bonding defects between the substrate and the protective coating of a turbine blade 10. Reference 11 represents a laser source, for example a YAG laser source. The laser beam emitted by the laser source 11 is conveyed by an optical fibre 12 up to a laser head 13. The laser head 13 directs the laser beam 14 towards the zones to be recuperated. During the operation, a gaseous protection system 15 protects the blade from corrosion and oxidation. The gaseous protection may be achieved by blowing an inert (for example argon) or reducing gas.

The invention claimed is:

1. A method of recuperating a turbine element constituted of a substrate, forming the body of the element, and a protective coating adhering to the substrate, the method comprising:
  identifying zones, during control of the turbine element, that include a bonding defect between the protective coating and the substrate; and
  eliminating the bonding defects between the protective coating and the substrate,
  wherein the bonding defects are eliminated by directing a laser beam onto each zone that includes the bonding defect,
  inducing a localized melting of the protective coating and the underlying substrate using the laser beam,
  stopping the laser beam, and
  cooling each zone such that bonding defects between the protective coating and the substrate at each zone are eliminated.

2. The method according to claim 1, in which the zones that include the bonding defect, identified during control of the turbine element, are geometrically analyzed in three dimensions and recorded in order to provide to the laser beam a determined path and to provide the laser beam characteristics that enable to eliminate each bonding defect.

3. The method according to claim 2, in which an optimal path of the laser beam on the turbine element is determined by geometric analysis of the zones that include the bonding defect based on positioning, geometry, and dimensions of the defective zones.

4. The method according to claim 1, in which the localized melting induced by the laser beam is carried out under inert or reducing atmosphere.

5. The method according to claim 1, in which the laser beam is directed onto the zones having a bonding defect by an optical fiber.

6. The method according to claim 1, in which the laser beam is emitted by a YAG laser.

7. The method according to claim 1, further comprising inspecting the turbine element to check if bonding defects remain between the protective coating and the substrate after eliminating the bonding defects.

8. The method according to claim 1, in which the turbine element is a turbine blade or knife edge seal.

9. The method according to claim 1, in which the step of eliminating the bonding defects between the protective coating and the substrate is implemented without input of metal.

10. The method according to claim 1, in which an average energy supplied by the laser beam is less than 100 W.

11. The method according to claim 1, in which a dimension of a focal spot of the laser beam is a function of the geometry of the defective zone.

12. The method according to claim 1, in which the step of identifying zones that include the bonding defect is performed after the protective coating is applied to the substrate.

13. The method according to claim 1, further comprising cleaning the surface of the turbine element prior to identifying zones that include the bonding defect.

* * * * *